United States Patent
Fuhrmann et al.

(10) Patent No.: US 8,997,920 B2
(45) Date of Patent: Apr. 7, 2015

(54) METHOD AND DAMPING ELEMENT FOR REDUCING THE NATURAL VIBRATION OF A COMPONENT

(71) Applicant: Faist Chemtec GmbH, Worms (DE)

(72) Inventors: Bernd Fuhrmann, Krumbach (DE); Christoph Grevener, Gechingen (DE); Christian Hardt, Kelsterbach (DE); Zdislaw Kornacki, Niederau-Heldenbergen (DE); Petra Lawrence, Aidlingen (DE); Heike Ursula Obst, Worms (DE); Dimitrios Patsouras, Frankfurt-Höchst (DE)

(73) Assignee: Faist Chemtec GmbH (DE)

( * ) Notice: Subject to any disclaimer, the term of this patent is extended or adjusted under 35 U.S.C. 154(b) by 0 days.

(21) Appl. No.: 14/024,941

(22) Filed: Sep. 12, 2013

(65) Prior Publication Data
US 2014/0008146 A1     Jan. 9, 2014

Related U.S. Application Data

(63) Continuation of application No. 13/988,782, filed as application No. PCT/EP2011/070626 on Nov. 22, 2011, now abandoned.

(30) Foreign Application Priority Data

Nov. 24, 2010    (DE) .................. 10 2010 052 417

(51) Int. Cl.
*G10K 11/16*      (2006.01)
*G10K 11/00*      (2006.01)
(Continued)

(52) U.S. Cl.
CPC ............... *G10K 11/002* (2013.01); *B60R 13/08* (2013.01); *G10K 11/16* (2013.01); *G10K 11/168* (2013.01)

(58) Field of Classification Search
CPC ..................................................... G10K 11/16
USPC ....................................................... 181/207
See application file for complete search history.

(56) References Cited

U.S. PATENT DOCUMENTS 5,629,503 A * 5/1997 Thomasen .................... 181/199
6,828,020 B2    12/2004 Fisher et al.
(Continued)

FOREIGN PATENT DOCUMENTS

CN     101112807 A     1/2008
CN     101406236 A     4/2009
(Continued)

OTHER PUBLICATIONS

International Search Report for corresponding application PCT/EP2011/070626 filed Nov. 22, 2011; Mail date Apr. 25, 2012.

*Primary Examiner* — Forrest M Phillips
(74) *Attorney, Agent, or Firm* — Cantor Colburn LLP

(57) ABSTRACT

The invention relates to a method for the reduction of the natural vibration (resonance) of a component (2). According to the invention a vibration behavior of component (2) is determined, wherein to each of the positions having vibration amplitudes, which exceed a preset threshold value, an attenuation element (1) is locally mounted, which is formed as a multilayered adhesive element including a support layer (1.1) and a self-adhesive damping mass. Moreover the invention relates to an attenuation element (1) for the reduction of the natural vibrations of a component (2). According to the invention the attenuation element (1) is formed as a multilayered adhesive element of a support layer (1.1) and a self-adhesive damping mass (1.2), wherein the support layer (1.1) is formed of a bend-resistant material and the damping mass (1.2) preferably is formed of butyl rubber.

7 Claims, 2 Drawing Sheets

Figure 1:
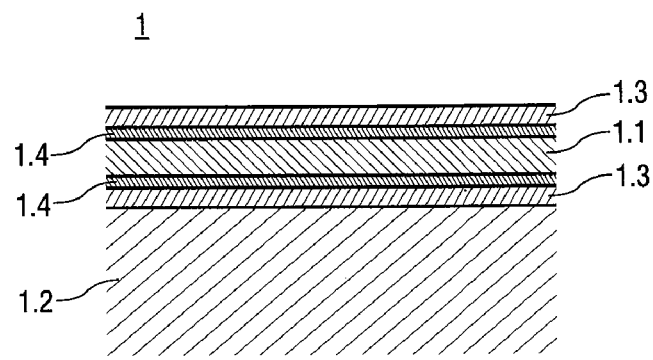

(51) Int. Cl.
*G10K 11/168* (2006.01)
*B60R 13/08* (2006.01)

(56) References Cited

U.S. PATENT DOCUMENTS

| | | | |
|---|---|---|---|
| 8,479,876 B2 * | 7/2013 | Fetsko et al. | 181/207 |
| 2004/0134711 A1 * | 7/2004 | Yoshimi et al. | 181/207 |
| 2009/0320980 A1 * | 12/2009 | Tanno | 152/209.2 |
| 2010/0122880 A1 * | 5/2010 | Hanna et al. | 188/18 A |
| 2011/0303503 A1 | 12/2011 | Merlette | |

FOREIGN PATENT DOCUMENTS

| | | |
|---|---|---|
| CN | 101880804 A | 11/2010 |
| DE | 102006007679 A1 | 8/2007 |
| DE | 102008050772 A1 | 5/2009 |
| DE | 102010049107 A1 | 6/2011 |
| EP | 0542201 A1 | 5/1993 |
| RU | 2101686 C1 | 1/1998 |

* cited by examiner

State of the art

State of the art

METHOD AND DAMPING ELEMENT FOR REDUCING THE NATURAL VIBRATION OF A COMPONENT

This application is a continuation of U.S. patent application Ser. No. 13/988,782, filed on May 22, 2013 which claims priority to International Application No. PCT/EP2011/070626, filed on Nov. 22, 2011. This application is further related to and claims the benefit of German Patent Application No. 10 2010 052 471.4, filed on Nov. 24, 2010. All of said applications are herein incorporated by reference in their entirety.

The invention relates to a method for the reduction of natural vibrations of a component and a damping or attenuation element, respectively, for the reduction of natural vibrations or resonance of a component.

It is generally known from state of the art that driving noises in the interior of a vehicle may be reduced by the application of acoustic materials such as damping or attenuation mats, respectively, and sprayable acoustic masses onto vehicle components. For the activation of damping by way of damping or attenuation mats large-area mats are applied onto a designated position on the vehicle component, which at subsequent processing temperatures will melt onto the base. The vehicle component will hereby be locally stiffened.

It is furthermore generally known from state of the art that in manufacturing a vehicle body, apertures in body components, for performing various operational steps such as fixation of the body components and performing corrosion preventive measures, are used. In performing corrosion preventive operations the apertures are provided for supplying paint during dip painting and/or as drain holes for excess paint. Alternatively or additionally supply of wax for cavity preservation and removal of excessive wax through the apertures is realized. In order to attain a low level of noise and seal tightness of the vehicle, apertures will be resealed subsequently in the production process. For example, the apertures will be manually closed and sealed by way of stoppers or adhesive elements, which are also called adhesive pads.

Such an adhesive element is known from the DE 10 2008 050 772 A1. The adhesive element has multiple layers and is formed of a support sheet and a self-adhesive damping mass, wherein the damping mass is butyl rubber. A top-coatable corrosion preventive layer is applied on at least one side facing away from the damping mass of the support sheet. The adhesive element is formed of aluminum, an aluminum alloy, stainless steel or polyethylene terephthalate.

The object of the invention resides in the provision of a method for the reduction of the natural vibrations of a component and a damping or attenuation element, respectively, for the reduction of the natural vibrations of a component.

As to the method, the object will be solved according to the invention by way of the features set forth in claim 1 and as to the damping or attenuation elements, respectively, will be solved by way of the features set forth in claim 6. Advantageous embodiments of the invention are subject matter of the dependent claims. According to the invention, in the method for the reduction of the natural vibrations of a component a vibration behavior of the component will be determined. A damping or attenuation element, respectively, is locally mounted on each of the identified positions, where vibration amplitudes exceeding a preset threshold value occur, the damping or attenuation element, respectively, being formed as a multilayered adhesive element including a support layer and a self-adhesive damping mass.

Due to local use of the adhesive elements which are formed as so called adhesive pads, as multilayered, stiff, damping or attenuation elements, respectively, and due to positional accuracy of arrangement thereof reduction of weight over large-area, heavy and extensive damping or attenuation mats and at the same time increase in acoustic effectiveness will be accomplished. The reduction in natural vibrations and increase in body-borne sound-damping resulting therefrom arises from bonding the multilayered adhesive element to the component, thereby accomplishing an especially stiff connection having high acoustic effectiveness. By using the method for the reduction of the natural vibrations of a vehicle component, reduction of a fuel consumption due to the contribution of low weight and thus reduction of pollutant and carbon dioxide emission in addition to increase in convenience for occupants of the vehicle will result.

With respect to known large-area conventional antidrumming sheets of bitumen body-borne sound damping may be reduced in combination with a 40%-60% weight reduction. Compared to the use of magnetic sheets for body-borne sound-damping reduction of weight is further increased. The effect of body-borne sound-damping may be seen in the courses of curves of transmitting functions dependent on a one-third octave center frequency which for example may be determined by way of laser scanning vibrometry.

Furthermore, material consumption is reduced due to the small size of the adhesive pads with respect to the large-area damping or attenuation mats and due to local or spot-like arrangement with respect to areal arrangement. In particular, cost savings will result therefrom. Furthermore the adhesive pads are characterized by ease of processing and mounting, especially to components having complicated geometries. Automated processing of the adhesive pads is also possible, resulting in reduction of production time and deployment and thus resulting in additional cost savings.

Figure 2A:
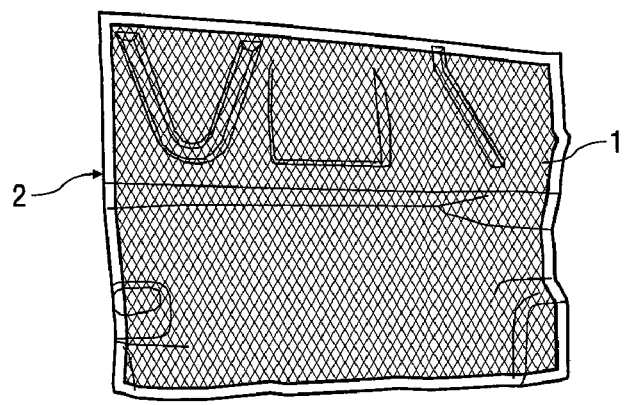
Figure 2B:
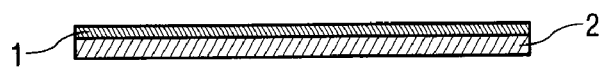
Figure 3:
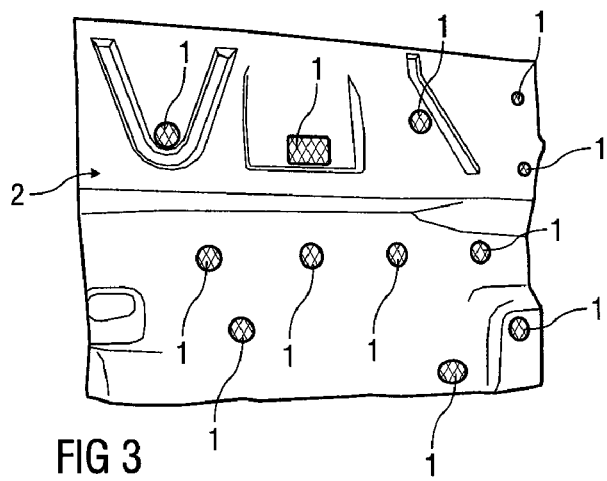
Figure 4:
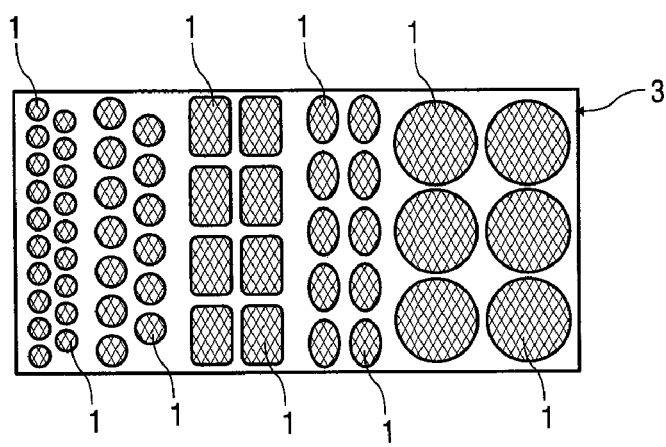

Illustrative embodiments of the invention will be explained in detail below, wherein FIG. 1 is a schematic view of a damping or attenuation element, respectively, according to the invention, FIG. 2A is a schematic view of a component including a damping or attenuation element, respectively, according to the state of the art, FIG. 2B is a schematic sectional view of a component including a damping or attenuation element, respectively, according to the state of the art, FIG. 3 is a schematic view, according to FIG. 1, of a component having applied thereon multiple damping or attenuation elements, respectively, and FIG. 4 is a schematic view of multiple damping or attenuation elements, respectively, which are applied on a support element.

Equal parts will be referred to by equal reference numbers in all figures.

FIG. 1 represents a damping or attenuation element 1, respectively, according to the invention (which in the following will be referred to as attenuation element since the element essentially has attenuation characteristics and only in part damping characteristics). The attenuation element 1 is formed as an adhesive element formed in multilayers of a support layer 1.1 and a self-adhesive damping mass 1.2.

Basically, such an attenuation element is known from DE 10 2008 050 772 A1, where however it is primarily used for a different purpose, i.e. for sealing apertures in a vehicle body.

In an especially preferred embodiment support layer 1.1 is formed of a so called 5xxx aluminum alloy including 0.2% to 6.2°/0 parts of magnesium. The 5xxx aluminum alloy is characterized by a high strength of 100 N/mm$^2$ to 450 N/mm$^2$.

Alternatively to the use of the 5xxx aluminum alloy the support layer 1.1 is formed of stainless steel, steel or another metal having high flexural strength as well as high strength. The support layer may for example be formed as 4xxx, 5xxx or 7xxx aluminum alloy.

Due to this high strength the attenuation element 1 is especially suited for the structure-borne sound attenuation or damping, respectively, of components 2. Such a component is illustrated in detail in FIG. 2. Simultaneously, the attenuation element 1 is suited for sealing apertures in components 2, especially in body components, and is applicable to component 2 in an especially simple manner.

The material forming the support layer 1.1 is furthermore characterized by high corrosion resistance, such that corrosion of the damping element 1 will be avoided.

In order to further improve corrosion resistance, corrosion preventive layer 1.3 is applied onto both sides of support layer 1.1. The corrosion preventive layer 1.3 is especially formed of paint or sheet, wherein preferably the paint is applied as a so called CTL substitute coating (CTL=cathodic dip coating) onto the support layer 1.1. Such CTL substitute coatings or CTL paint systems, respectively, are special paints which are optimized for their subsequent application. They are based on polyurethane, epoxide, melamine, polyester and/or a blend thereof. Lubricants are preferably mixed into a top coating as well to assure subsequent elasticity or flexibility, respectively, of the damping element 1. Thus, the latter may be adapted in a preferred manner to the respective component.

The corrosion preventive layer 1.3 formed of the paint or the sheet preferably is applicable onto support layer 1.1 in a coil coating process, which also is known as ribbon coating or continuous metal ribbon coating.

Especially, the corrosion preventive layer 1.3 is formed of polyethylene. Moreover, due to the corrosion preventive layer 1.3 adhesion to the support layer 1.1 of the damping mass 1.2 which is formed of butyl rubber is improved. Additionally a top coat may be applied onto the corrosion preventive layer 1.3 such that attenuation element 1 is paintable with the color of the vehicle in a simple manner.

In order to further assure adhesion of the corrosion preventive layer 1.3 to the support layer 1.1 an adhesion promoting layer 1.4 is applied onto both sides of the support layer 1.1. The adhesion promoting layer 1.4 is preferably free of chromium and is applied onto both sides of the support layer 1.1 as a thin liquid film. The adhesion promoting layer 1.4 is preferably formed of Alodine® NR 1453 of Henkel. This adhesion promoting layer 1.4 is simultaneously characterized in that it also effects corrosion protection for the support layer 1.1.

In a further embodiment of the damping element 1 it is furthermore possible that the support layer 1.1 of a plastic material is formed with an equally high strength wherein corrosion of the support layer 1.1 is not possible so that at least the corrosion preventive layer 1.3 may be omitted. An adhesion promoting layer 1.4 is suitably applied onto at least one side of the plastic material, such that improved adhesion of paint applied onto the support layer 1.1 is increased. Thus, a top-coat may be applied onto the damping element 1 in a simple manner and may optically be adapted to the color of the component.

The multilayered design of the damping element 1 including support layer 1.1 formed of the bending-resistant material and the damping mass 1.2 formed of butyl rubber is characterized by excellent acoustic features, so called antidrumming features, and simple and flexible processing.

The damping mass 1.2 formed of butyl rubber is characterized in that it is permanently applicable onto sheet metals lubricated with corrosion protective oil. Moreover the damping element 1 is characterized by chemical resistance to water, alcohol, diluted acids and bases. The butyl rubber is especially made on the basis of thermoplastic elastomers, polymers, adhesive resins, fillers, thixotropic agents as well as other modifiers.

In order to avoid electric conductivity between the support layer 1.1 and the body component through damping mass 1.2 and thus corrosion of the support layer 1.1 and/or of the body element the corrosion preventive layer 1.3 incorporated between the support layer 1.1 and the damping mass 1.2 is formed in an electrically insulating manner.

Alternatively or additionally to incorporating the electrically insulating corrosion preventive layer 1.3 a butyl rubber may be employed for the reduction of the electrical conductivity of the damping mass 3 which is depleted of particular fillers, such as for example carbon black.

FIG. 2A shows a top view of a component 2, which according to the state of the art is provided with an attenuation element 1 in the form of a large-area damping or attenuation mat (herein the mat has both damping and attenuating features) providing for the desired damping or attenuation of body-borne sound, respectively. FIG. 2B shows a sectional view of component and damping mat 1. As it may clearly be seen from the figures excessive material must be spent for this state of the art damping mat whereby additional gain in weight of components will occur.

Unlike this, FIG. 3 shows the solution according to the invention in the form of a component 2 having multiple damping elements 2 applied thereon. In the executive example represented component 2 is a body component of a vehicle formed of sheet metal. In an alternative embodiment the component is a component from different fields, for example construction industry, ship building industry, aircraft manufacturing, or appliance manufacturing. Furthermore component 2 may be formed of sheet steel, sheet aluminum, paint-coated or CTL-coated parts as well as plastic parts.

During operation of component 2 vibrations and sound may occur. In the illustrative embodiment of component 2 which is represented as a body component of the vehicle vibrations and sound are generated at component 2 during operation of the vehicle. In order to minimize occurrence of any vibrations and sound a body-borne sound of component 2 is attenuated and dampened by way of local, i.e. spot-like application of multiple damping elements 1 onto component 2.

For this a vibration behavior of component 2 will be determined in a simulation.

In an especially preferred embodiment body-borne sound examinations are performed by way of laser scanning vibrometry studies with component 2 or at the merging of multiple components 2, such as vehicle bodies.

For this component 2 is tightly clamped at an upper edge in a manner not represented in details and excited by way of an electrodynamic vibration stimulator, which is also called shaker. A frequency spectrum of excitation includes a range of generally 40 Hz to 1000 Hz.

The vibrations of component 2 which are generated are for example monitored with a scanning laser Doppler vibrometer which is also not show herein. For this a measuring scan having a plurality of scanning points is imposed on component 2. At first, component 2 is excited in an empty state by the vibrations, i.e. without damping elements 1 or other damping or attenuation means applied, wherein distribution of the vibrations across component 2 is measured by way of the scanning laser Doppler vibrometer at different frequencies. Thereby for each frequency a so called color map is generated, wherein different vibration amplitudes are represented by different colors.

From the respective colors in the color map the vibration amplitudes is read out. Areas of component 2 having high vibration amplitudes contrast strongly in color from the remaining areas.

At the positions where the vibration amplitudes exceed a preset threshold value a damping element 1 is mounted at each component 2 for local stiffening.

The damping element 1 is adhered and mounted onto the component 2 by the damping mass 1.2. The damping element 1 may be arranged at positions of component 2 consisting of solid material or where apertures in component 2 are located. For this the damping element 1 is simultaneously used for sealing apertures at component 2.

In a further embodiment an effect of the damping elements 1 arranged at component 2 will be examined by way of performing the measurement a second time, for example by laser scanning vibrometry and analysis of the generated color maps. The effect of damping elements 1 will eventually be optimized by adjustments, depending on the results. The adjustments will especially be performed by arranging damping elements 1 of different sizes, by positional readjustment of the applied damping elements 1 and/or by arranging additional damping elements 1.

The acoustic effect of the damping elements 1 is set by multiple parameters: on the one hand it will be set by elasticity (E-modulus), thickness, density, and area weight of the damping mass 1.2, and on the other hand by thickness, area weight and stiffening the support layer 1.1.

In order to attain excellent damping or attenuation, respectively, of body-borne sound the support layer 1.1 preferably has a thickness of 0.1 mm to 0.4 mm.

The sandwich-like design of the damping elements 1 in association with bonding the damping element 1 to component 2 will locally accomplish a high area moment of inertia. Consequently, a very high stiffening of component 2 and associated increase in body-borne sound-damping and anti-drumming will result. The antidrumming effect is the larger the stiffer the material of the support layer 1.1 which is used.

Especially damping elements 1, the support layer 1.1 of which is formed of aluminum and the damping layer 1.2 of which is formed of butyl rubber show very good antidrumming effect. I.e. surface vibrations of component 2 will significantly be dampened, such that the body-borne sound will be reduced and emission of air-borne sound will be avoided. However, other materials may also be used for the damping layer 1.2, such as for example bitumen. Advantageously, stiffness of the damping layer 1.2 is lower than stiffness of the support layer 1.1.

In order to be able to perform optimized mounting of the damping element 1 at the contours of component 2 despite of the high stiffness of the damping element 1 the damping elements 1 are manufactured in different sizes and forms such that a large area of component 2 having high vibration amplitude is able to be stiffened by way of a precisely fitting attenuation element 1 or multiple damping elements 1.

Application of the damping elements 1 onto component 1 is done manually, by arranging one or more damping elements 1 at the position having high vibration amplitude, which was determined for example by way of laser scanning vibrometry. These positions may however be determined also by way of other methods.

From the use of the support layer 1.1 formed of material having high bending resistance it advantageously results that the damping elements 1 alternatively or additionally are applicable onto component 2 in an automated way.

As it is shown in FIG. 4 the attenuation element 1 is thereby for example mounted by means of a robot, separately from a support element 3 and subsequently onto component 2 in an automated manner. Application of the damping elements 1 may be performed both for body-borne sound damping or attenuation, respectively, of component 2 and for tightly sealing apertures in component 2. Such a support element 3 having multiple damping elements 1 arranged thereon is represented in FIG. 4.

Support element 3, the so called liner, is formed as a preconditioned flat sheet onto which multiple damping elements 1 are applied. The support element 3 is thereby formed of paper, polyethylene or polyethylene terephthalate sheets.

In a particular embodiment all variants of damping elements 1 required for a specific application, for example a vehicle, are arranged as a set on a sheet or on multiple sheets. The formation of the support element 3 as a flat sheet allows for control of the multitude of variations of the damping elements 1 in a specific application associated with minimum waste of material and consumption of space.

Furthermore with respect to the use of damping elements 1 applied on rolls there is the advantage that uncontrolled detachment of the damping elements 1 from the support element will be avoided. Moreover scrap material due to production may only be discarded with bent material. Roll material or continuous material however may cause disruptions of an application facility for the automated application of the damping elements 1.

The invention claimed is:

1. A method for the reduction of the natural vibrations of a component, wherein, a vibration behavior of the component is determined at a plurality of positions and an attenuation element is mounted in a spot-like manner with positional accuracy to each of the plurality of positions having vibration amplitudes exceeding a preset threshold value, wherein the attenuation elements are formed as a multilayered adhesive element including a support layer and a self-adhesive damping mass.

2. The method according to claim 1, wherein, the vibration behavior is determined in a simulation.

3. The method according to claim 1, wherein, the vibration behavior is determined by way of laser scanning vibrometry.

4. The method according to claim 1, wherein, the attenuation element is mounted to component manually and/or in an automated manner.

5. The method according to claim 1, wherein, the attenuation element is mounted separately from a support element and to the component in an automated manner.

6. The method according to claim 1, wherein, the attenuation element is formed as a multilayered adhesive element of a support layer and a self-adhesive damping mass, wherein the support layer is formed of a bending-resistant material and the damping mass is formed of a material, the stiffness of which is lower than that of the support layer, the material of the support layer being an intrinsically hard aluminum alloy or stainless steel.

7. The method according to claim 6, wherein, the intrinsically hard aluminum alloy is a 5xxx aluminum alloy.

* * * * *